United States Patent
Honda et al.

(10) Patent No.: US 6,545,096 B1
(45) Date of Patent: Apr. 8, 2003

(54) HEAT-RESISTANT PLASTIC SHEET AND INFUSION BAG USING THE SAME

(75) Inventors: Minoru Honda, Osaka (JP); Kenji Ohmori, Osaka (JP); Hitoshi Futagawa, Osaka (JP); Yoshihisa Hama, Osaka (JP)

(73) Assignee: Nipro Corporation, Osaka (JP)

( * ) Notice: Subject to any disclaimer, the term of this patent is extended or adjusted under 35 U.S.C. 154(b) by 141 days.

(21) Appl. No.: 09/684,398

(22) Filed: Oct. 10, 2000

(30) Foreign Application Priority Data

Oct. 8, 1999 (JP) ............................... 11-287855

(51) Int. Cl.$^7$ .............................................. C08L 23/00
(52) U.S. Cl. ........................................ 525/240; 604/408
(58) Field of Search ............................ 525/240; 604/408

(56) References Cited

U.S. PATENT DOCUMENTS

| | | | |
|---|---|---|---|
| 5,089,322 A | * 2/1992 | Matsunaga et al. | 428/220 |
| 6,114,456 A | * 9/2000 | Dewart et al. | 525/240 |
| 6,316,560 B1 | * 11/2001 | Jacobs et al. | 26/281 |
| 6,326,432 B1 | * 12/2001 | Fujita et al. | 525/191 |
| 6,329,465 B1 | * 12/2001 | Takahashi et al. | 525/191 |
| 6,333,387 B1 | * 12/2001 | Takahashi et al. | 525/240 |
| 6,372,848 B1 | * 4/2002 | Yang et al. | 525/191 |

FOREIGN PATENT DOCUMENTS

| | | |
|---|---|---|
| EP | 0 601 631 A1 | 6/1994 |
| EP | 0 735 090 A1 | 10/1996 |
| EP | 0 844 277 A1 | 5/1998 |
| FR | 1385020 | 4/1965 |
| JP | 58-165866 A | 9/1983 |
| JP | 6-209981 A | 8/1994 |
| JP | 6-329848 A | 11/1994 |
| JP | 2550256 B2 | 8/1996 |
| JP | 9-099035 A | 4/1997 |
| JP | 11-019183 A | 1/1999 |

* cited by examiner

Primary Examiner—John Fox
(74) Attorney, Agent, or Firm—Kubovcik & Kubovcik

(57) ABSTRACT

An infusion bag which does not generate a significant number of fine particles in liquid contained in the bag, and has excellent transparency and flexibility, and also has sufficient heat resistance so that deformation does not occur even during sterilization at 115° C. A heat resistant sheet to form the infusion bag is formed from a polymer composition containing 50–70% by weight of a straight-chain polyethylene having a density of 0.928 g/cm$^3$ or more and produced using a metallocene catalyst, 10–30% by weight of a low density polyethylene produced under high-pressure and 20–40% by weight of a straight-chain polyethylene having a density of 0.91 g/cm$^3$ or less and produced using a metallocene catalyst.

4 Claims, No Drawings

HEAT-RESISTANT PLASTIC SHEET AND INFUSION BAG USING THE SAME

FIELD OF THE INVENTION

The present invention relates to a heat-resistant plastic sheet. Further, the present invention relates to an infusion bag formed by the heat-resistant plastic sheet, which has excellent transparency and flexibility, and which does not generate a significant number of insoluble fine particles in liquid contained in the bag.

BACKGROUND OF THE INVENTION

Requirements for a plastic medical vessels such as an infusion bag or a blood preservation bag are flexibility and transparency. In addition, heat resistance to high-pressure steam sterilization is required. Olefin polymers such as polyethylene or polypropylene, polyvinyl chlorides, ethylene-vinyl acetate copolymers, etc. have conventionally been used as a material for medical vessels. Of these, polyethylene has been particularly used as a material for an infusion bag, because of its excellent chemical resistance.

However, although low density polyethylene has relatively excellent flexibility and transparency, it has poor heat resistance because of its low softening point. For this reason, this kind of polyethylene does not withstand high-pressure steam sterilization, and is subject to deformation, whitening, blocking, and the like.

Conventional polyethylene vessels also have a problem relating to the generation of insoluble particles. The insoluble particles are particles that can be examined in an insoluble particle test in injection that is standardized in the Pharmacopeia of Japan ($13^{th}$ version). The particles also should be examined in a test of a plastic medical apparatus that is also standardized in the Pharmacopeia of Japan ($13^{th}$ version). Each test is used to determine the size and number of the particles in a liquid container. The former test is more strict than the latter test. An infusion bag should pass both tests to sell it in the market. The insoluble particles are believed to be contaminants eluted or degraded from the resin by the chemicals contained in the vessel.

As a technique for reducing such defects of polyethylene vessels various proposals have been made in which the material for forming a vessel is made of a multilayer sheet so as to have the three properties described above; i.e., flexibility, transparency and heat resistance (Japanese Patent No. 2550256, Japanese Patent Application Laid-open No. Sho 58-165866, Japanese Patent Application Laid-open No. Hei 6-209981, etc.). The bag disclosed in Japanese Patent No. 2550256 is made of a multilayer sheet of which inner and outer layers are made from a high density polyethylene as a main component, and an interlayer between the inner layer and the outer layer is made from a straight-chain low density polyethylene. The vessel disclosed in Japanese Patent Application Laid-open No. Sho 58-165866 is made of a multilayer sheet having an interlayer comprising a polymer such as ethylene-vinyl acetate copolymer or elastomer. Further, the vessel disclosed in Japanese Patent Application Laid-open No. Hei 6-209981 is made of a multilayer sheet having a straight-chain low density polyethylene as a first layer and a polymer composition comprising a high density polyethylene and a low density polyethylene as a second layer.

However, the multilayer sheet has a defect in that formation of a multilayer involves complicated layer-forming conditions, resulting in an increase in production costs. Because of this defect, a low-density polyethylene produced with a metallocene catalyst (hereinafter referred to as "M-LLDPE") is recently noted as a material for forming a bag which has excellent flexibility and transparency. In addition, medical vessels using such a resin have been proposed (Japanese Patent Application Laid-open No. Hei 6-329848, Japanese Patent Application Laid-open No. Hei 9-99035, Japanese Patent Application Laid-open No. Hei 11-19183, etc.).

Alternatively, the medical vessel disclosed in Japanese Patent Application Laid-open No. Hei 9-99035 is formed from a multilayer sheet in which an inner layer or an interlayer comprises M-LLDPE having a density of 0.928 $g/cm^3$ or less and accordingly transparency and flexibility are improved. Further, in a medical vessel disclosed in Japanese Patent Application Laid-open No. Hei 11-19183, a wall of the vessel main body comprises a M-LLDPE layer having a density in a range of 0.921–0.925 $g/cm^3$ (M-LLDPE content is 60% or more in the layer and constitutes a main layer having 60% or more thickness) and, accordingly, in addition to transparency and flexibility, heat dimensional stability is improved.

The polymer composition disclosed in Japanese Patent Application Laid-open No. Hei 6-329848 is a blend of (I) a polymer composition comprising (A) 5–95 wt % of a C3–20 α-olefin/ethylene copolymer having a density of 0.880–0.940 $g/cm^3$ and an intrinsic viscosity of 1.0–10.0 dl/g (at 135° C. in decalin) and (B) 5–95 wt % of a C3–20 α-olefin/ethylene copolymer having a density of 0.910–0.96 $g/cm^3$ and an intrinsic viscosity of 0.5–2.0 dl/g (at 135° C. in decalin), each copolymer having specifically determined relationships between Tm(° C.) and density, melting tension and melt flow rate (MFR), and weight of soluble components and density, and (II) a low density polyethylene produced by a high pressure radical method and having an MFR of 0.1–50 g/10 min and satisfying a certain relationship between molecular weight distribution and MFR. The weight ratio of the polymer composition (I) to the low density polyethylene (II) is in a range of 99:1 to 60:40. A film formed by the polymer composition shows excellent transparency and heat-resistance.

However, although medical vessels made from the M-LLDPE have excellent transparency, heat resistance of the vessels is not sufficient resulting in frequent deformation due to heat when the vessels are sterilized at 115° C., which is a problem. Further, the medical vessel disclosed in Japanese Patent Application Laid-open No. Hei 9-99035, which uses a multilayer sheet, also has a defect in its forming process under complicated conditions, resulting in an increase in production costs.

The present invention has been made in view of the above circumstances, and an object of the present invention is to provide an infusion bag which does not generate a significant number of fine particles in liquid contained in the bag, which has excellent transparency and flexibility, and which also has sufficient heat resistance so that deformation does not occur even when sterilization is carried out at 115° C.

SUMMARY OF THE INVENTION

As a result of extensive investigations to solve the above-mentioned problems, the inventors of the present invention have found that an infusion bag material which has good heat resistance, excellent transparency, impact resistance and flexibility and which does not generate a significant number of insoluble fine particles in liquid contained in the bag is obtained by appropriately combining three kinds of polyethylenes having different properties. These polyethylenes are a straight-chain polyethylene having a density of 0.928 g/cm$^3$ or more and produced using a metallocene catalyst, and which does not generate a significant number of insoluble fine particles in liquid contained in the bag and has excellent heat resistance; a low density polyethylene produced under high pressure having high viscosity in melting and good transparency; and a straight-chain polyethylene having a density of 0.91 g/cm$^3$ or less and produced using a metallocene catalyst and which has excellent flexibility and impact resistance.

That is, the present invention relates to a heat-resistant plastic sheet formed from a polymer composition containing 40–75% by weight, preferably 50–70% by weight, of (a) a straight-chain polyethylene having a density of 0.928 g/cm$^3$ or more and produced with a metallocene catalyst; 5–35% by weight, preferably 10–30% by weight, of (b) a low density polyethylene produced under high pressure; and 15–45% by weight, preferably 20–40% by weight, of (c) a straight-chain polyethylene having a density of 0.91 g/cm$^3$ or less and produced with a metallocene catalyst. Further, the present invention relates to an infusion bag formed using this heat-resistant plastic sheet.

As used herein, the terminology "a straight-chain polyethylene produced using a metallocene catalyst" refers generally to a copolymer of ethylene with one or more co-monomers selected from C3 to C20 alpha-olefins, such as 1-butene, 1-hexane, 1-octene, methyl pentene and the like, in which the polymer molecules comprise long chains with relatively few side chain branches. These polymers are obtained by low pressure polymerization processes using metallocene catalysts. The side branching which is present is short compared to non-linear polyethylenes (e.g., LDPE, a low density polyethylene homopolymer).

Metallocene catalysts are homogeneous catalysts having high catalytic activity. Co-monomers such as higher carbon olefins which cannot be copolymerized with ethylene or propylene using conventional catalysts can be copolymerized. The copolymerized amount is increased by the catalysts and many new polymers, especially polymers having superior tacticity are obtained. Metallocene catalysts are described, for example in U.S. Pat. Nos. 4,542,119; 5,324,800; 5,703,187, and others.

The straight-chain polyethylenes employed in the present invention are preferably formed by a single-site metallocene catalyst such as those disclosed in the Japanese Application Laid Open Nos. Hei 6-329848, Hei 10-7848 and 2000-202002, the teachings of which are incorporated herein by the reference.

The straight-chain polyethylene (a) has a density of about 0.928 g/cm$^3$ or more, preferably in the range of from 0.928 to 0.960 g/cm$^3$, determined according to Japanese Industrial Standard K6760-1981. The melt flow rate of the straight-chain polyethylene (a) is 0.1 to 10 g/10 min. determined under a load of 2160 g at a temperature of 190° C. according to Japanese Industrial Standard K7210-1976.

The straight-chain polyethylene (c) has a density of about 0.91 g/cm$^3$ or less, preferably in the range of from 0.870 to 0.910 g/cm$^3$, determined according to Japanese Industrial Standard K6760-1981. The melt flow rate of the straight-chain polyethylene (c) is 0.1 to 10 g/10 min. determined under a load of 2160 g at a temperature of 190° C. according to Japanese Industrial Standard K7210-1976.

As used herein, the terminology "low density polyethylene produced under high pressure" refers generally to a branched low density polyethylene produced by high pressure radical polymerization. Usually, the low density polyethylene is produced by polymerizing ethylene in the presence of a radical initiator under a temperature of 150 to 350° C. and a pressure of 500 to 3000 kg/cm$^2$. The density of the low density polyethylene (b) produced under high pressure is preferably in the range of 0.910 to 0.935 g/cm$^3$. The melt flow rate of the low density polyethylene is 0.1 to 30 g/10 min. determined under a load of 2160 g at a temperature of 190° C. according to Japanese Industrial Standard K7210-1976.

In order to form the heat-resistant sheet of the present invention by inflation, a clearance of a die lip is desirably 2.5 mm or more so that melt fracture of the sheet does not occur by shear force during extrusion at a high speed (8 m/min or more). Further, the molding temperature is desirably 180–210° C. in terms of the die temperature. If molding is conducted at a die temperature of more than 210° C., burning or fish eye on the sheet occurs. Additionally, melt viscosity decreases, there by making it difficult to make a film. Compression ratio of a screw (one-pitch volume of the bottom of the screw v. one-pitch volume of the top of the screw) is desirably 3.0 or less. If the compression ratio exceeds this value, self-heat generation increases, making it difficult to make a sheet.

In the present invention, the thickness of the heat resistant sheet is about 200 to 300 $\mu$m, preferably about 220 to 280 $\mu$m.

The infusion bag means a bag which contains liquid suitable for treating a patient, such as dialysate, nutrient solution, saline, blood, infusion solution and the like. The shape or dimension of the infusion bag can be varied according to the desired application.

Examples of the present invention will now be specifically explained.

EXAMPLES 1–7

A straight-chain polyethylene (M-PE-1) having a density of 0.928 g/cm$^3$ or more and a melt flow rate 2.0 g/10 min., and produced with a metallocene catalyst (trademark 7P07A, made by Toso Corp.), low density polyethylene (LDPE) having a density of 0.922 g/cm$^3$ and a melt flow rate of 0.6 g/10 min. and produced under high-pressure (trademark 175K, made by Toso Corp.) and a straight-chain polyethylene (M-PE-2) having a density of 0.91 g/cm$^3$ or less and a melt flow rate of 2.0 g/10 min. and produced with a metallocene catalyst (trademark 9P52A, made by Toso Corp.) were mixed in the proportions shown in Table 1 using a blender. A tubular sheet having a flat width of 100 mm and a wall thickness of 250$\mu$m was prepared using an inflation machine under molding conditions of a lip clearance of 2.5 mm, draw speed of 8 m/min. and die temperature of 190° C. To prepare 10 vessels, the tubular sheet was then cut into lengths of 150 mm, and both terminal ends of the cut sheets were sealed by heat. Each vessel was evaluated for heat resistance, transparency, presence or absence of fine particles in a liquid contained in the bag and flexibility (impact resistance, flexibility). The results are shown in Table 2.

The evaluation of the characteristics was done according to the following criteria.

Heat resistance evaluation:

After one terminal end was sealed, 100 ml of physiological saline was introduced into each vessel (width 100 mm×length 150 mm), and then the other terminal end of the vessel was sealed. Sterilization treatment was conducted at 115° C. and an inner pressure of 2.0 Kgf/cm$^2$ for 30 minutes using a high-pressure steam sterilizer.

Sterilization was conducted on a tray having a width of 350 mm, a length of 950 mm and a depth of 40 mm. 64 holes are formed in the bottom of the tray by punching. Each hole has a diameter of 25 mm. An infusion bag is positioned over four holes in the tray (fourteen bags are positioned in one tray). The bag has a width of 100 mm and a length of 140 mm. After the treatment, it was confirmed whether the shape of a hole on the tray on which the vessel was sterilized was transferred to the bag. A vessel in which the shape of a hole is not transferred to the bag is regarded as having good heat resistance.

Transparency evaluation: Light transmission in water contained in the vessel at a wavelength of 450 nm was measured with a spectrophotometer.

Fine particle evaluation: Fine particles in water contained in the vessel after sterilization at 115° C. were measured with a fine particle counter (trademark CI-1000, manufactured by CLIMET).

Impact resistance evaluation: Conducted using a pendulum impact tester (DG-TB), manufactured by Toyo Seiki K.K., according to Japanese Industrial Standard (JIS) K 7160.

Drop strength test: A vessel containing water was dropped from a height of 150 cm at room temperature, and breakage of the vessel resulting from such drop was confirmed.

COMPARATIVE EXAMPLES 1–10

Ten samples of the same vessel as in the Examples were prepared using polymer compositions mixed in the proportions shown in Table 1. Each vessel was evaluated for heat resistance, transparency, generation of fine particles and flexibility. The results are shown in Table 2.

As is shown in Table 2, the sheets of the present invention passed all of the tests. On the other hand, in Comparative Examples 4, 5, 9 and 10, in which the amount of M-PE-1 was less than 45%, heat resistance of the vessels was poor and the vessels had melted, resulting in deformation. Because of this deformation, evaluation as to the transparency, generation of fine particles and flexibility could not be conducted. Further, in Comparative Examples 1 and 3, in which the amount of M-PE-1 exceeded 75% and LDPE was less than 5%, there was a problem of transparency, and in Comparative Examples 1, 2, 6 and 7, in which M-PE-2 was less than 15%, there was a problem of flexibility. Further, in Comparative Example 8, in which M-PE-2 used in Example 5 was replaced with a metallocene catalyst type straight-chain polyethylene (M-PE-3) having a density higher than that of M-PE-2, sufficient flexibility was not obtained.

TABLE 1

| Material | Density | Blending ratio |
|---|---|---|
| Example 1 | | |
| M-PE-1 | 0.930 | 7 |
| LDPE | 0.922 | 1 |
| M-PE-2 | 0.906 | 2 |
| Example 2 | | |
| M-PE-1 | 0.930 | 5 |
| LDPE | 0.922 | 1 |
| M-PE-2 | 0.906 | 4 |
| Example 3 | | |
| M-PE-1 | 0.930 | 5 |
| LDPE | 0.922 | 3 |
| M-PE-2 | 0.906 | 2 |

TABLE 1-continued

| Material | Density | Blending ratio |
|---|---|---|
| Example 4 | | |
| M-PE-1 | 0.930 | 7 |
| LDPE | 0.922 | 1 |
| M-PE-2 | 0.900 | 2 |
| Example 5 | | |
| M-PE-1 | 0.930 | 7 |
| LDPE | 0.922 | 1 |
| M-PE-2 | 0.890 | 2 |
| Example 6 | | |
| M-PE-1 | 0.928 | 7 |
| LDPE | 0.922 | 1 |
| M-PE-2 | 0.906 | 2 |
| Example 7 | | |
| M-PE-1 | 0.980 | 65 |
| LDPE | 0.922 | 10 |
| M-PE-2 | 0.906 | 25 |
| Comparative Example 1 | | |
| M-PE-1 | 0.930 | — |
| Comparative Example 2 | | |
| M-PE-1 | 0.930 | 8 |
| LDPE | 0.922 | 2 |
| Comparative Example 3 | | |
| M-PE-1 | 0.930 | 8 |
| M-PE-2 | 0.900 | 2 |
| Comparative Example 4 | | |
| M-PE-1 | 0.930 | 4 |
| LDPE | 0.922 | 3 |
| M-PE-2 | 0.906 | 3 |
| Comparative Example 5 | | |
| M-PE-2 | 0.925 | 8 |
| LDPE | 0.922 | 2 |
| Comparative Example 6 | | |
| M-PE-1 | 0.930 | 7 |
| LDPE | 0.922 | 2 |
| M-PE-2 | 0.900 | 1 |
| Comparative Example 7 | | |
| M-PE-1 | 0.930 | 75 |
| LDPE | 0.922 | 20 |
| M-PE-2 | 0.900 | 5 |
| Comparative Example 8 | | |
| M-PE-1 | 0.928 | 7 |
| LDPE | 0.922 | 1 |
| M-PE-3 | 0.912 | 2 |
| Comparative Example 9 | | |
| M-PE-2 | 0.925 | — |
| Comparative Example 10 | | |
| M-PE-1 | 0.930 | 3 |
| LDPE | 0.922 | 1 |
| M-PE-2 | 0.905 | 6 |

TABLE 2

| | Mold-ability | Fine particle | Trans-parency | Heat resis-tance | Impact resis-tance | Drop strength |
|---|---|---|---|---|---|---|
| Example 1 | ○ | 9.9 | 74.6 | ○ | 270 | 0 |
| Example 2 | ○ | 16.7 | 73.1 | ○ | 389 | 0 |
| Example 3 | ○ | 22.3 | 75.0 | ○ | 259 | 0 |
| Example 4 | ○ | 12.5 | 74.8 | ○ | 292 | 0 |
| Example 5 | ○ | 34.5 | 73.2 | ○ | 279 | 0 |
| Example 6 | ○ | 39.2 | 74.2 | ○ | 328 | 0 |
| Example 7 | ○ | 32.6 | 76.2 | ○ | 293 | 0 |
| Comparative Example 1 | x | 26.6 | 41.0 | ○ | 153 | 3 |
| Comparative Example 2 | ○ | 32.4 | 74.7 | ○ | 206 | 2 |
| Comparative Example 3 | x | 64.2 | 57.4 | ○ | 315 | 0 |
| Comparative Example 4 | ○ | — | — | x | — | — |
| Comparative Example 5 | ○ | — | — | x | — | — |
| Comparative Example 6 | ○ | 16.7 | 74.3 | ○ | 173 | 1 |
| Comparative Example 7 | ○ | 14.5 | 72.6 | ○ | 156 | 2 |
| Comparative Example 8 | ○ | 15.4 | 70.3 | ○ | 225 | 1 |
| Conparative Example 9 | x | — | — | x | — | — |
| Comparative Example 10 | ○ | — | — | x | — | — |

(Note) Sterilization temperature was 115° C. Samples in which the number of fine particles having a diameter of 1–2μ or more were 100/ml or less, transparency after sterilization was 70% or more and impact resistance was 250 kgf/cm² or more were considered to be acceptable products. Further, the drop strength is shown by the number of broken vessels when the vessels were dropped from a height of 150 cm at room temperature of 23° C. Regarding moldability and heat resistance, ○ means good and X means bad.

EFFECTS OF THE INVENTION

As is apparent from the foregoing explanation, in the present invention, an infusion bag, which has good flexibility, transparency and heat resistance, and does not generate a significant number of fine particles in liquid contained in the bag, can be provided. Further, molding of the sheet is easy and the cost of the sheet is inexpensive because the sheet of the bag is comprised of a single-layer film. As a result, inexpensive infusion bags can be provided.

What is claimed is:

1. A heat-resistant plastic sheet comprising a polymer composition containing 45–75% by weight of (1) a straight-chain polyethylene having a density of 0.928 g/cm³ or more and produced using a metallocene catalyst, (2) 5–35% by weight of a low density polyethylene produced under high pressure, and (3) 15–45% by weight of a straight chain polyethylene having a density of 0.91 g/cm³ or less and produced using a metallocene catalyst.

2. A heat-resistant plastic sheet according to claim 1, wherein the composition contains 50–70% by weight of the straight-chain polyethylene (1), 10–30% by weight of the low density polyethylene (2), and 20–40% by weight of the straight chain polyethylene (3).

3. An infusion bag having excellent heat resistance, wherein a wall of a main body of the infusion bag is constituted of the heat-resistant plastic sheet according to claim 1.

4. An infusion bag having excellent heat resistance, wherein a wall of a main body of the infusion bag is constituted of the heat-resistant plastic sheet according to claim 2.

* * * * *